(12) United States Patent
Arnold et al.

(10) Patent No.: US 7,556,062 B2
(45) Date of Patent: Jul. 7, 2009

(54) SOLENOID VALVE WITH INTEGRATED STRUCTURE

(75) Inventors: William John Arnold, Davison, MI (US); Robert Andrew Dayton, Attica, MI (US)

(73) Assignee: Eaton Corporation, Cleveland, OH (US)

( * ) Notice: Subject to any disclaimer, the term of this patent is extended or adjusted under 35 U.S.C. 154(b) by 407 days.

(21) Appl. No.: 11/227,054

(22) Filed: Sep. 15, 2005

(65) Prior Publication Data

US 2007/0056645 A1    Mar. 15, 2007

(51) Int. Cl.
  *F16K 31/06*   (2006.01)
  *F15B 13/044*  (2006.01)
(52) U.S. Cl. ............................. 137/625.65; 251/129.21
(58) Field of Classification Search ............ 137/625.65; 251/129.08, 129.21; 335/258, 273, 274
See application file for complete search history.

(56) References Cited

U.S. PATENT DOCUMENTS

| | | | | |
|---|---|---|---|---|
| 3,703,165 A | * | 11/1972 | Hansen | 123/518 |
| 4,917,150 A | * | 4/1990 | Koch et al. | 137/625.65 |
| 5,064,166 A | * | 11/1991 | Schechter | 251/129.15 |
| 5,076,326 A | | 12/1991 | McCabe | |
| 5,445,189 A | * | 8/1995 | Yamamuro | 137/625.65 |
| 5,488,973 A | * | 2/1996 | Yamamuro | 137/625.65 |
| 5,509,439 A | * | 4/1996 | Tantardini | 137/625.65 |
| 5,584,323 A | * | 12/1996 | Yamamuro | 137/625.65 |

* cited by examiner

*Primary Examiner*—John Rivell
*Assistant Examiner*—Craig Price
(74) *Attorney, Agent, or Firm*—Anna M. Shih

(57) ABSTRACT

A solenoid valve and method has a simplified structure that integrates the fluid metering functions of the spool in the armature, thereby eliminating the need for a separate spool, bearings, and pin in the valve. The armature has a aperture that communicates with at least one port in a valve body. The position of the differential in the armature with respect to the ports in the valve body controls the pressure of fluid exiting the outputs of the valve body. In one embodiment, the same overall valve structure can be modified to form both inversely proportional valves and directly proportional valves. By integrating the fluid metering functions of the spool into a single ported armature, the inventive valve assembly reduces the number of parts in the valve, simplifying construction.

8 Claims, 5 Drawing Sheets

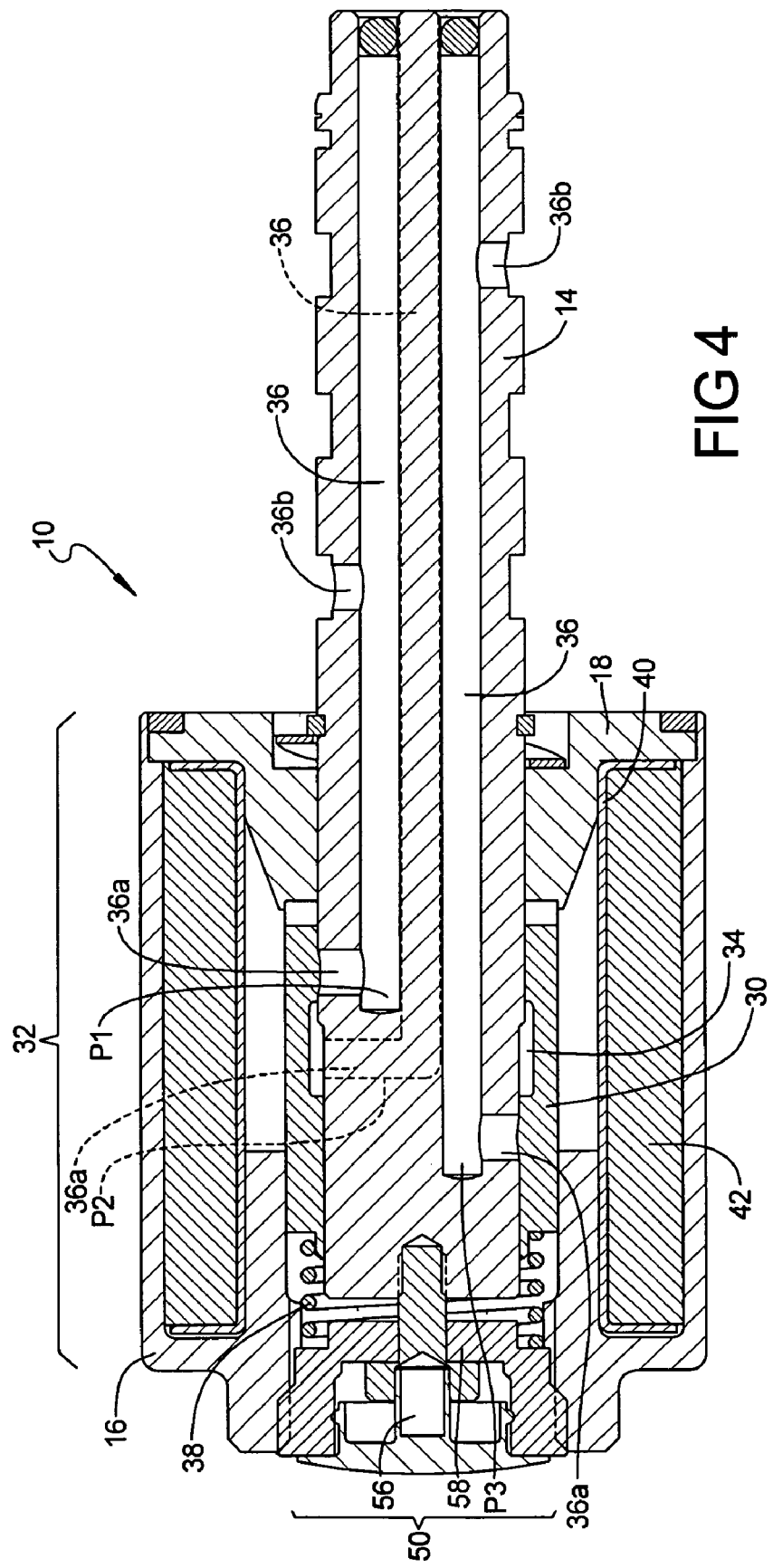

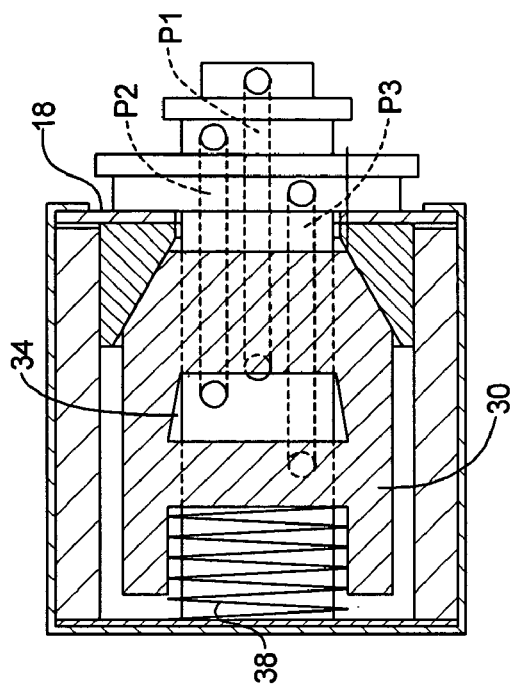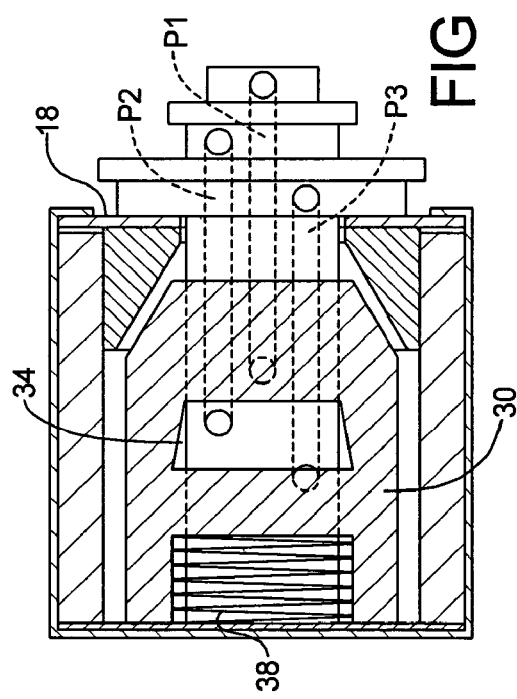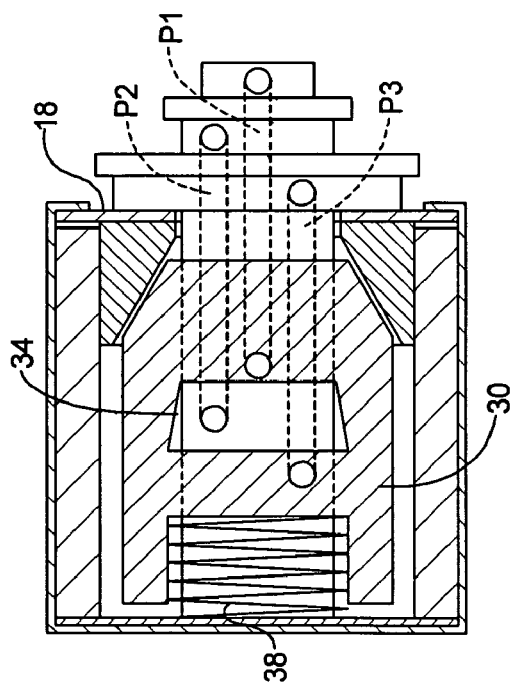

SOLENOID VALVE WITH INTEGRATED STRUCTURE

TECHNICAL FIELD

The present invention relates to electrically operated valves, and more particularly to electrically operated solenoid valves that control fluid pressure based on the amount of current through the solenoid.

BACKGROUND OF THE INVENTION

Solenoid operated valves have found widespread usage in on-board vehicle applications for controlling hydraulic pressure and fluid flow in automatic shifting power transmissions on the vehicle. Conventional solenoid valve structures include a solenoid that receives an electrical current signal, an armature that moves in response to the signal via magnetic force, and a spool that operates in response to the armature movement to change a pressure output of the valve. A pin acts as a mechanical interface between the armature and the spool. A spring force acts on the armature as well; as a result, the position of the armature and spool, and therefore the valve pressure, depends on the counterbalance of forces in the spring, the magnetic forces on the armature, and the hydraulic pressure. Normally, the spool is continually engaged with the armature via any pressure imbalances on the spool, the spring force, or both. The spool therefore meters fluid out of the valve based on the armature position.

Occasionally, contaminants may enter the valve. To loosen the contaminants so that they can be flushed out of the valve, a dithered signal is applied to the armature to continually oscillate the armature, and therefore the spool. However, proper valve operation requires the armature and spool to be in constant contact. Low operating pressures within the valve may cause the spool to lose contact with the armature, preventing dither in the armature from being transferred to the spool. As a result, any future movement by the spool must first overcome static friction, causing the spool to unstick itself in an uncontrolled fashion, creating undesirably rapid pressure change at the valve output.

Also, currently known valve structures require tight manufacturing tolerances. The alignment of the pin, armature and spool are particularly delicate and must be perfectly linear and centered to ensure proper valve operation. If any one of these components is even slightly out of alignment, the valve will fail. The pin, in particular, must be perfectly aligned with the spool; however, the length of the pin and the spool causes any misalignments in the pin to be magnified at the spool. The many components in current valve assemblies makes it challenging to manufacture and introduces greater opportunities for potential valve malfunctions.

There is a desire for a solenoid valve assembly that operates more reliably and also has a simpler construction than currently known valve assemblies.

BRIEF SUMMARY OF THE INVENTION

The present invention is directed to a solenoid valve and method having a simplified structure that integrates the fluid metering functions of the spool in the armature, thereby eliminating the need for a separate spool, bearings and pin in the armature. The valve assembly includes an armature that is responsive to a spring force, a magnetic force generated by the solenoid, and fluid pressure in the valve. The armature has an aperture that communicates with at least one port in a valve body. The position of the differential in the armature with respect to the ports in the valve body controls the pressure of fluid exiting the outputs of the valve body. In one embodiment, the same overall valve structure can be modified by changing the position of a pole piece and the porting in the valve body to form both inversely proportional valves and directly proportional valves.

By integrating the fluid metering functions of the spool into a single ported armature, the inventive valve assembly reduces the number of parts in the valve and simplifies the alignment of parts within the valve. Moreover, the simplified valve structure allows the same overall structure be used for different types of valves with only minor modifications.

BRIEF DESCRIPTION OF THE DRAWINGS

FIG. 4 is a section view taken along line 2-2 of FIG. 1 of an alternative embodiment of the invention; and FIGS. 5A through 5C are schematic diagrams of a relationship between the aperture in the armature and the ports at various stages of operation in the valve of FIG. 4.

DETAILED DESCRIPTION OF THE INVENTION

Figure 1:
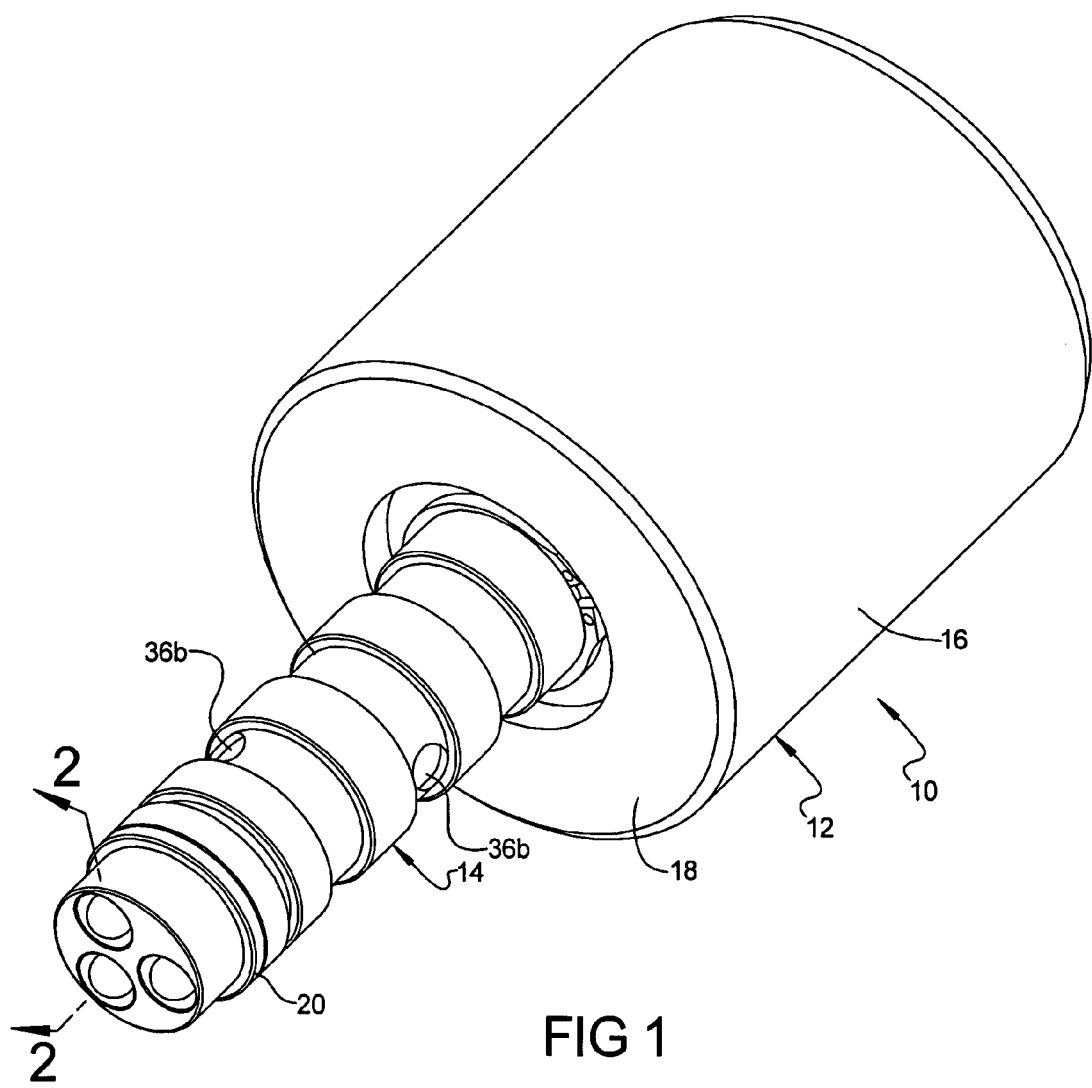
FIG. 1 is a perspective view of a representative solenoid valve assembly.

Referring to FIG. 1, a valve 10 having an inventive integrated structure includes a housing 12 and a valve body 14. The housing 12 encases other valve components and includes a casing portion 16 and a cover portion 18. As will be described in greater detail below, either the casing 16 or the cover 18 can act as a magnetic pole for the valve 10, depending on the desired operation of the valve 10. An exposed portion 20 of the valve body 14 is configured to fit in a manifold (not shown) and has one or more openings 36b through which fluid can flow at various pressures.

Figure 2:
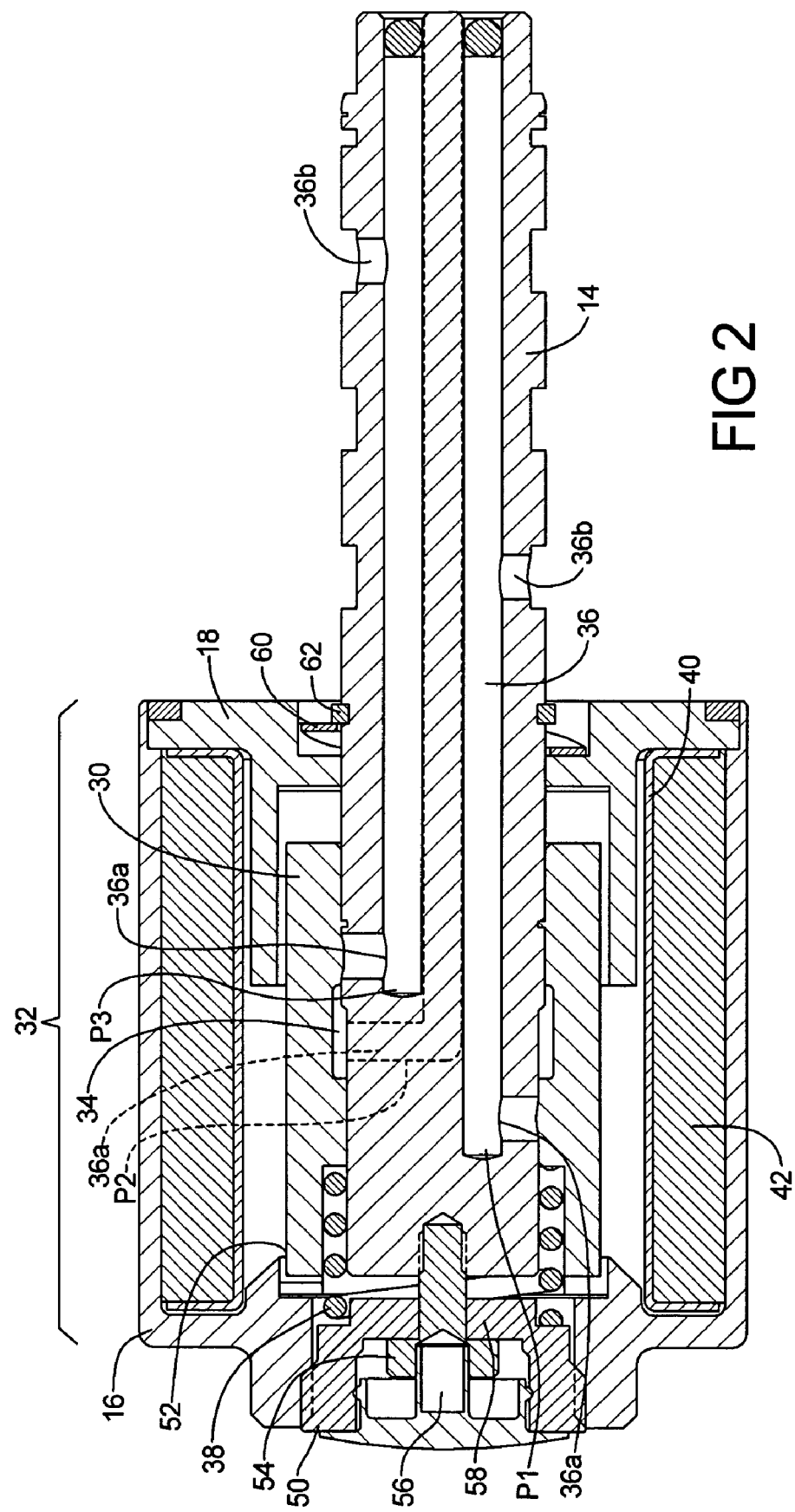
FIG. 2 is a representative section view of the valve taken along line 2-2 in FIG. 1.

FIG. 2 is a section view of the valve 10 taken along line 2-2 of FIG. 1. In this embodiment, the cover portion 16 of the housing 12 acts as the magnetic pole for the valve 10 to create an inversely proportional valve. The housing 12 encases an armature 30 that surrounds a hidden portion 32 of the valve body 14. The armature 30 has an aperture 34 that communicates with one or more ports 36 of the valve body 14 to meter fluid flow in response to changes in fluid pressure at the ports 36. The ports 36 each have a first opening 36a within the housing 12 and a second opening 36b outside the housing 12, allowing fluid to freely communicate through the ports 36 to and from a fluid supply (not shown), a fluid exhaust (not shown) and a manifold (not shown). The fluid pressure within the aperture 34 pushes the armature 30 toward the casing 16 (toward the left in the orientation shown in FIG. 2). A spring 38 also applies a biasing force on the armature 30 to push the armature 30 toward the cover 18 (toward the right in FIG. 2), in the opposite direction of the force from the fluid pressure in the aperture 34.

The armature 30 is disposed inside a non-magnetic bobbin 40, which supports a conductive winding forming a solenoid 42. As is known in the art, current flow through the solenoid 42 generates a magnetic force having a strength that is proportional to the amount of current, and this magnetic force is applied to the armature 30 to pull the armature toward the casing 16 of the housing 12 (toward the left in the orientation shown in FIG. 2). As a result, the position of the armature 30 is dependent on the interacting forces applied to the armature 30 by the spring 38, the magnetic force, and the hydraulic force generated by the fluid flowing through the aperture 34. The armature 30 will change position until these forces counterbalance each other into an equilibrium state. In this inversely proportional valve example, the spring force is equal to the sum of the magnetic force and the fluid force applied to the armature 30, or $F_{magnet}+F_{fluid}=F_{spring}$. In this example, the output pressure of the valve 10 decreases as the current to the valve 10 increases.

As a result, the fluid pressure at the outputs 36 can be controlled by changing the amount of current through the solenoid 42, which in turn changes the magnetic force on the armature 30; the movement of the armature's position will then change which internal openings 36a are covered or exposed, changing the control pressure inside the ports 36 through the valve body 14 and therefore changing the output pressure of the valve 10.

A calibration assembly 50 is connected to the housing 12 to allow control of the tension in the spring 38 and/or the size of an air gap 52 between the casing 16, which acts as the magnetic pole in this embodiment, and the armature 30 The calibration assembly 50 can have any desired structure and is not critical to the claimed invention. In one embodiment, the calibration assembly 50 includes a first threaded portion 54 that engages with the valve body 14 to set the size of the air gap 52 and a second threaded portion 58 that engages with the first threaded portion 54 to set the spring 38 tension. In one embodiment, the first and second threaded portions 54, 58 are threaded in opposite directions (i.e., one has a left-hand thread and the other has a right-hand thread), and a calibration support 56 locks the first threaded portion 54 and the second threaded portion 58 together.

Near the cover portion 18 of the housing 12, a spring washer 60 creates physical resistance against movement of the first threaded portion 54 to set the size of the air gap 52. A clip 62 is attached to the valve body 14 to hold the valve 10 assembly together.

Figure 3A:
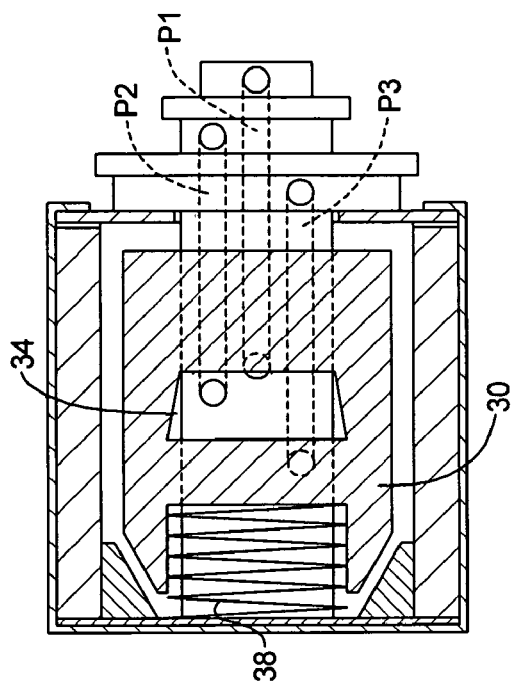
FIGS. 3A through 3C are schematic diagrams of a relationship between a aperture in the armature and the ports at various stages of operation in the valve of FIG. 1.
Figure 3B:
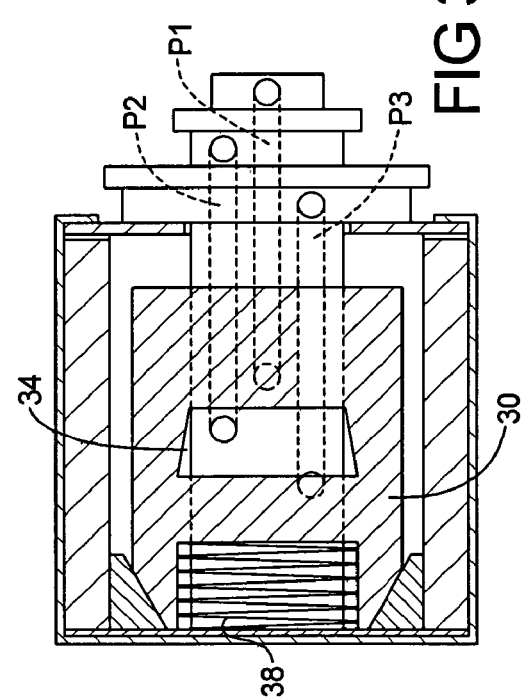
Figure 3C:
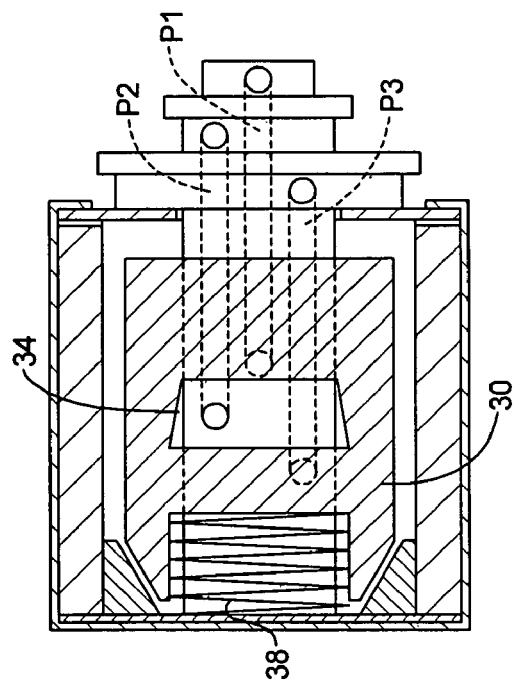

FIGS. 3A through 3C show the armature 30 in various operating states. Because the valve 10 in this embodiment is an inversely proportional valve, the fluid pressure at the valve output 36 decreases as the current applied to the solenoid 42 increases.

The port openings 36a in the hidden portion 32 of the valve body 14 include a supply port P1, a control port P2, and an exhaust port P3. The control port P2 is always fluidically coupled to the armature 30 via the aperture 34 and controls the output pressure of the valve 10. As can be seen in the figures, the aperture 34 is configured so that the control port P2 is connectable primarily to either the supply port P1 or the exhaust port P3. To change the output pressure, the magnetic force $F_{magnet}$ applied to the armature 30 is changed, causing the armature 30 to move along the valve body 14. This, in turn, causes the aperture 34 to connect the control port P2 to either the supply port P1 or exhaust port P3, depending on whether the fluid pressure is to be increased or decreased at the output 36b of the control port P2. The changing fluid pressure brings the armature 30 back to an equilibrium state.

FIG. 3A shows the armature in a steady state position. At this point, $F_{magnet}+F_{fluid}=F_{spring}$ and therefore the aperture 34 only exposes the control port P2, substantially covering the supply port P1 and the exhaust port P3 so that only leakage fluid can enter or exit the aperture 34, allowing the armature 30 to maintain its steady state position. If there is no current being sent through the solenoids, the magnetic force $F_{magnet}$ is zero, and the fluid force $F_{fluid}$ is equal to the spring force $F_{spring}$. During manufacturing, the spring force is calibrated via the calibration assembly 50 based on the desired fluid force that will be considered "steady state" when the solenoid is de-energized.

Referring to FIG. 3B, increasing the current through the solenoid 42 decreases the fluid pressure at the control port P2 and therefore its corresponding output 36b. More particularly, the increasing current will increase the magnetic force $F_{magnet}$ acting on the armature 30, causing the armature to move toward the casing portion 16 of the housing 12 (toward the left) acting as the magnetic pole. This creates a pressure imbalance because the increased magnetic force $F_{magnet}$ causes the sum of the magnetic force $F_{magnet}$ and the fluid force $F_{fluid}$ to be greater than the counteracting spring force $F_{spring}$. The new position of the armature 30, as shown in FIG. 3B, causes the aperture 34 to be fluidically coupled to both the control port P2 and the exhaust port P3. This allows fluid contributing to the excess fluid pressure $F_{fluid}$ to flow from the control port P2 into the aperture 34 and out the exhaust port P3, decreasing the fluid pressure $F_{fluid}$ in the control port P2 and causing the armature 30 to move and meter (i.e., cover/uncover the supply port P1 and/or the exhaust port P3 to varying degrees) in response to the changing fluid pressure. The fluid pressure $F_{fluid}$ continues to decrease until it compensates for the increased magnetic force $F_{magnet}$ to equalize the spring force $F_{spring}$. At this point, the armature has metered so that the armature 30 covers the exhaust port P3 nearly completely and is at the steady state (FIG. 3A) at the new fluid pressure.

When the current is reduced or shut off, the magnetic force $F_{magnet}$ will go down as well. As a result, the imbalance between the fluid force $F_{fluid}$ and the spring force $F_{spring}$ will cause the fluid force within the aperture 34 to initially push the armature 30 toward the cover portion 18 of the housing 12 (because the spring force $F_{spring}$ at this point will be greater than the sum of the magnetic force $F_{magnet}$ and the fluid pressure $F_{fluid}$). This causes the aperture 34 in the armature to fluidically couple the control port P2 with the supply port P1, as shown in FIG. 3C. Additional fluid flows from the supply port P1 into the aperture 34 and increase the fluid pressure $F_{fluid}$ at the control port P2, causing the armature 30 to move and meter the fluid flow until the fluid pressure in the aperture compensates for the decreased magnetic force $F_{magnet}$ to equalize the spring force $F_{spring}$. Once this occurs, the armature 30 will again reach the steady state position in FIG. 3A, substantially closing off the supply port P1 to maintain the fluid pressure corresponding to the amount of current through the solenoid 42.

The examples described above focus on an inversely proportional valve assembly, but the same inventive concept can be used in a proportional valve. FIGS. 4 and 5A through 5C show the structure and operation of a proportional valve 10 according to one embodiment of the invention. In this embodiment, the cover portion 18 of the housing 12 serves as the magnetic pole. In this embodiment, the valve 10 operates according to the equation $F_{magnet}=F_{spring}+F_{fluid}$. The pole orientation and the spring tension causes the valve 10 to operate so that when the output pressure of the valve 10 increases as the current to the valve 10 increases.

The steady state position of the armature 30 relative to the inputs 36a of the ports 36 as shown in FIG. 5A is conceptually the same as the position shown in FIG. 3A, with the aperture 34 in the armature fluidically coupled to the control port P2, with possible leakage coming through the supply port P1 and the exhaust port P3 to maintain the selected fluid pressure. To increase the fluid pressure, the current through the solenoid 42 is increased, thereby increasing the magnetic force $F_{magnet}$ on the armature 30. As a result, the combined spring force $F_{spring}$ and increased magnetic force $F_{magnet}$ is initially greater than the fluid force $F_{fluid}$, pushing the armature 30 toward the cover 18 (i.e., toward the right in FIG. 4). As a result, the aperture 34 exposes the supply port P1 and couples it with the control port P2 (FIG. 5C). Fluid then flows through the supply port P1 into the control port P2 and is metered by the armature 30 until the increased fluid pressure $F_{fluid}$ compensates for the increase in the magnetic force $F_{magnet}$.

Decreasing the current through the solenoid 42 decreases the magnetic force $F_{magnet}$, thereby decreasing the fluid pressure $F_{fluid}$ at the output 36b corresponding to the output port P2. More particularly, the reduction in the magnetic force $F_{magnet}$ causes the combined forces applied on the armature 30 by the magnet $F_{magnet}$ and the spring $F_{spring}$ to be less than the force applied in the opposite direction by the fluid $F_{fluid}$, forcing the armature 30 toward the calibration assembly 50 (toward the left in FIG. 4). This causes the aperture 34 to uncover the exhaust port P3 and couple it to the control port P2, which in turn allows fluid to drain out of the control port P2 through the aperture 34 and out the exhaust port P3 to reduce fluid pressure. The position of the aperture adjusts and meters until the fluid pressure $F_{fluid}$ has been reduced sufficiently to compensate for the drop in magnetic force $F_{magnet}$.

By configuring the armature 30 with an aperture 34 that meters fluid flow through the inputs 36a of the ports in the valve body 14, the inventive structure eliminates the need for a separate spool, bearings, and armature pin, thereby reducing the number of components in the valve 10 compared to currently known assemblies. Also, aligning the various components in the inventive valve 10 is simpler because the armature 30 is tube-shaped and fits around the valve body 14; as a result, if the armature 30 is properly aligned with the hidden portion 32 of the valve body 14 the valve 10 will work properly. This structure makes it difficult to misalign the armature 30 with the valve body 14 and also ensures that any misalignments that do occur are not magnified along the entire length of the valve body 14.

Also, the lack of a separate spool in the inventive valve 10 makes it impossible for any disconnection between the armature 30 and pressure control. As a result, dithering of the armature can be reliably conducted by simply varying the current applied to the valve; proper dithering is not dependent on the fluid pressure in the valve 10. These factors improve the valve's reliability and robustness. The simple configuration also makes it possible to use the same overall configuration for different valve types (i.e., proportional, inversely proportional) through minor machining modifications, reducing manufacturing complexity.

Although the invention has hereinabove been described with respect to the illustrated embodiments, it will be understood that the invention is capable of modification and variation and is limited only by the following claims.

What is claimed is:

1. A solenoid operated valve, comprising:
   a valve body having a control port, a supply port, and an exhaust port formed therein;
   a solenoid that generates a magnetic force;
   an armature disposed inside the solenoid and that surrounds a portion of the valve body, wherein the armature is movable in response to the magnetic force along at least a portion of the valve body, the armature having an aperture that selectively couples the control port with at least one of the supply port and exhaust port to control a fluid force through the control port;
   a spring that applies a spring force on the armature, wherein a position of the armature is controlled by a combination of the magnetic force, the fluid force, and the spring force; and
   a housing having a casing that covers the solenoid, a first portion of the valve body, and the armature and a cover, wherein at least one of the casing and the cover is a magnetic pole in the valve,
   wherein the valve body has a second portion disposed outside the housing, and wherein the control port, supply port, and exhaust port each have an input opening disposed in the first portion for coupling with the armature and an output opening disposed in the second portion.

2. The valve of claim 1, wherein the valve is an directly proportional valve, wherein:
   the casing is the magnetic pole; and
   the armature moves to equalize the magnetic force with a sum of the fluid force and the spring force.

3. The valve of claim 1, wherein the fluid force causes the aperture to couple the control port with the supply port when the magnetic force decreases and wherein the fluid force causes the aperture to couple the control port with the exhaust port when the magnetic force increases.

4. The valve of claim 1, wherein the valve is an inversely proportional valve, wherein:
   the cover is the magnetic pole; and
   the armature moves to equalize the spring force with a sum of the magnetic force and the fluid force.

5. The valve of claim 2, wherein the fluid force causes the aperture to couple the control port with the supply port when the magnetic force increases and wherein the fluid force causes the aperture to couple the control port with the exhaust port when the magnetic force decreases.

6. The valve of claim 1, further comprising a calibration assembly that sets at least one of a spring force and an air gap in the valve.

7. A method of manufacturing a solenoid operated valve, comprising:
   forming a valve body having a control port, a supply port, and an exhaust port formed therein:
   placing an armature to surround a first portion of the valve body;
   placing a solenoid to surround at least a portion of the armature, wherein the solenoid generates a magnetic force; and
   placing the first portion of the valve body, the armature, the solenoid, and a spring in a housing having a casing and a cover, wherein the housing leaves a second portion of the valve body disposed outside the housing,
   magnetizing at least one of the casing and the cover to form a magnetic pole
   coupling the armature with a spring that applies a spring force on the armature, wherein a position of the armature is controlled by a combination of the magnetic force, the fluid force, and the spring force.
   attaching a calibration assembly to the valve, and
   adjusting at least one of an air gap and the spring force with the calibration assembly,
   wherein the armature is movable in response to the magnetic force along at least a portion of the valve body the armature having an a aperture that selectively couples the control port with at least one of the supply port and exhaust port to control a fluid force through the control port,
   wherein the valve is an inversely proportional valve, and wherein the adjusting step comprises adjusting the spring force to be equal to a sum of the fluid force and the magnetic force at steady state.

8. A method of manufacturing a solenoid operated valve, comprising:

forming a valve body having a control port, a supply port, and an exhaust port formed therein;

placing an armature to surround a first portion of the valve body;

placing a solenoid to surround at least a portion of the armature, wherein the solenoid generates a magnetic force; and placing the first portion of the valve body, the armature, the solenoid, and a spring in a housing having a casing and a cover, wherein the housing leaves a second portion of the valve body disposed outside the housing, magnetizing at least one of the casing and the cover to form a magnetic pole coupling the armature with a spring that applies a spring force on the armature, wherein a position of the armature is controlled by a combination of the magnetic force, the fluid force, and the spring force.

attaching a calibration assembly to the valve, and adusting at least one of an air gap and the spring force with the calibration assembly, wherein the armature is movable in response to the magnetic force along at least a portion of the valve body, the armature having an aperture that selectively couples the control port with at least one of the supply port and exhaust port to control a fluid force through the control port, wherein the valve is a directly proportional valve, and wherein the adjusting step comprises adjusting the spring force to be equal to a difference between the magnetic force and the fluid force at steady state.

* * * * *